(12) United States Patent
Lazar et al.

(10) Patent No.: US 10,805,787 B2
(45) Date of Patent: Oct. 13, 2020

(54) DETERMINING LOCATION OF A FEMTOCELL USING A MOBILE DEVICE TRANSMITTING OVER AN UNLICENSED BAND

(71) Applicant: T-Mobile USA, Inc., Bellevue, WA (US)

(72) Inventors: Dragos Dumitru Lazar, Issaquah, WA (US); Aram Falsafi, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/242,911

(22) Filed: Jan. 8, 2019

(65) Prior Publication Data

US 2020/0221282 A1    Jul. 9, 2020

(51) Int. Cl.
*H04W 8/08* (2009.01)
*H04W 64/00* (2009.01)
*H04W 84/12* (2009.01)
*H04W 88/08* (2009.01)
*H04W 88/16* (2009.01)

(52) U.S. Cl.
CPC ............. *H04W 8/08* (2013.01); *H04W 64/00* (2013.01); *H04W 84/12* (2013.01); *H04W 88/08* (2013.01); *H04W 88/16* (2013.01)

(58) Field of Classification Search
CPC .................................................. H04W 4/029
USPC ............ 455/422.1, 456.1, 418, 432.1, 414.1, 455/435.1, 444
See application file for complete search history.

(56) References Cited

U.S. PATENT DOCUMENTS

| 7,957,705 | B1 * | 6/2011 | Oh | H04B 15/00 |
| | | | | 455/104 |
| 2006/0261933 | A1 * | 11/2006 | Deniau | G07C 5/008 |
| | | | | 340/426.15 |
| 2011/0117932 | A1 * | 5/2011 | Breitbach | G01S 5/0205 |
| | | | | 455/456.1 |
| 2013/0196680 | A1 * | 8/2013 | Soliman | H04W 64/003 |
| | | | | 455/456.1 |
| 2013/0322392 | A1 * | 12/2013 | Abe | H04W 48/12 |
| | | | | 370/329 |
| 2017/0086199 | A1 * | 3/2017 | Zhang | H04W 24/02 |
| 2017/0245115 | A1 * | 8/2017 | Lei | H04W 4/90 |
| 2017/0325274 | A1 * | 11/2017 | Xu | H04W 8/14 |

\* cited by examiner

*Primary Examiner* — Nghi H Ly
(74) *Attorney, Agent, or Firm* — Lee & Hayes, P.C.

(57) ABSTRACT

A technique of determining a location of a small cell access point in a wireless communication network is discussed herein. The small cell access point communicates with a nearby mobile device using an unlicensed radio frequency (RF) band radio, of the small cell access point. The small cell access point receives, from the mobile device over the unlicensed RF band, location information related to a location of the mobile device. The small cell access point provides the location information to a gateway within the wireless communication network. Based at least in part on the location information, the gateway may register the small cell access point for service within the wireless communication network and a licensed RF band radio of the small cell access point is activated.

20 Claims, 4 Drawing Sheets

DETERMINING LOCATION OF A FEMTOCELL USING A MOBILE DEVICE TRANSMITTING OVER AN UNLICENSED BAND

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

As the number of users of mobile telecommunication devices has increased and continues to increase, access to wireless communication networks is increasingly important. Due to increased access of wireless communication networks in homes and businesses, as well as the increase in access to wireless communication networks in public places, congestion has become a larger problem. In order to improve accessibility to wireless communication networks, small cells, e.g., femtocells, picocells and micro cells, have been developed for accessing wireless communication networks using small cell access points. However, in order for a small cell access point to be registered for use, the wireless communication network needs to know the actual location of the small cell access point in order to provide emergency services to users that access the small cell, e.g., E911 services, if such services are requested, and to ensure that the small cell access point is located in a region where the operator of the wireless communication network has a license to operate its licensed band radio equipment. Thus, until a small cell access point provides accurate location information, the small cell access point cannot register for service with the wireless communication network, e.g., cannot transmit and receive Radio Frequency (RF) signals in a licensed RF band for the wireless communication network. Thus, such location information needs to be provided upon initial activation of the small cell access point and/or after power cycling of the small cell access point. Unfortunately, an indoor small cell access point often does not have access to Global Positioning System (GPS) signals to determine its location. In fact, some small cell access points may not include a GPS receiver.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
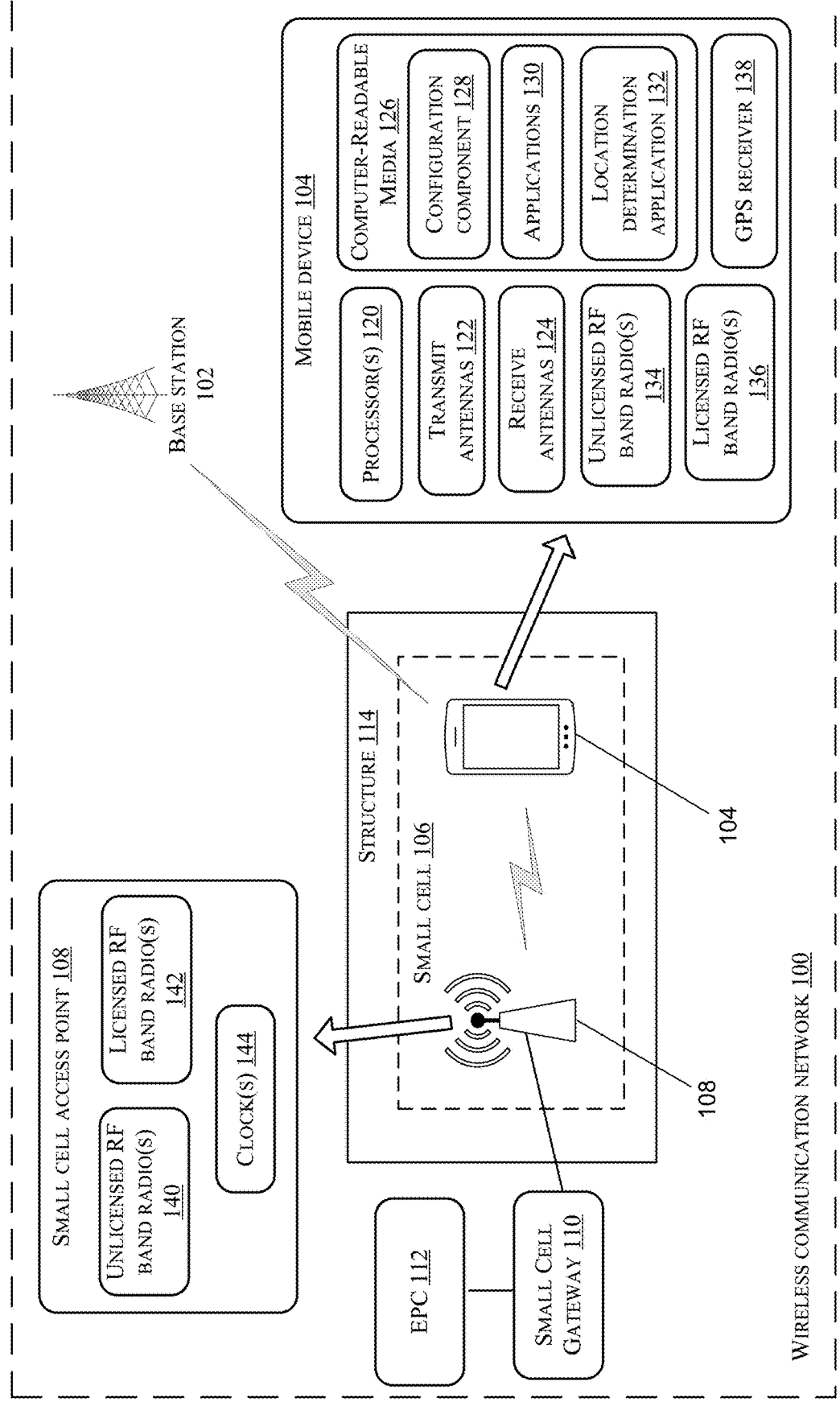
FIG. 1 schematically illustrates an example of a wireless communication network, in accordance with various configurations.

Described herein are techniques and architecture for determining a location of a small cell access point. Upon initial activation and/or after power cycling of the small cell access point, the small cell access point may communicate with a nearby mobile device using an unlicensed radio frequency (RF) band radio, e.g., WiFi, Bluetooth, etc. The mobile device may then provide its location to the small cell access point using the unlicensed RF band radio. Since unlicensed band radios have a very short transmission range for communicating with mobile devices, the fact that the small cell access point and the mobile device can communicate over unlicensed radio indicates that the location of the mobile device actually correlates to the location of the small cell access point. The small cell access point may then provide the location to a small cell access point gateway of a wireless communication network in order to register the small cell access point for service within the wireless communication network.

In particular, when a small cell access point, e.g., a femtocell access point, a picocell access point or a micro cell access point, is initially activated, the small cell access point may activate an unlicensed RF band radio, e.g., a WiFi radio or Bluetooth radio, and communicate with a nearby mobile device. The small cell access point may request the location of the mobile device. The mobile device may determine its location using a Global Positioning System (GPS) receiver included with the mobile device. If the mobile device does not include a GPS receiver, the mobile device may obtain its location from a base station with which the mobile device has currently registered for service within the wireless communication network. The mobile device may then provide the location information using a corresponding unlicensed RF band radio included with the mobile device. For example, the mobile device may provide the location information to the small cell access point using WiFi.

The small cell access point may then provide the location information received from the mobile device to a small cell access point gateway of the wireless communication network, indicating that this location information corresponds to the small cell access point's own location. The small cell access point gateway may, based upon the location information, register the small cell access point for service within the wireless communication network. In a configuration, the small cell access point communicates with the small cell access point gateway over a network, e.g., the Internet. Once the small cell access point is registered for service within the wireless communication network, the small cell access point may operate a licensed RF band radio, e.g., transmit and receive RF signals according to 3rd Generation Partnership Project (3GPP) protocols, Universal Mobile Telecommunications System (UMTS) protocols, Long Term Evolution (LTE) protocols, Fifth Generation (5G) protocols, etc. Once the mobile device receives RF signals in the licensed band from the small cell access point, the mobile device may perform a handover from the base station to the small cell access point and receive services, e.g., voice call services, data services, etc., from the wireless communication network via the small cell access point.

In configurations, the mobile device may include a location determination application that may be utilized to determine the location of the mobile device using, for example, a GPS receiver included with the mobile device, GPS information from a base station, etc. The location determination application may automatically provide the location information to the small cell access point upon detection, by the mobile device, of the small cell access point over the unlicensed RF band. In configurations, the location determination application may determine the location of the mobile device and provide the location information to the small cell access point upon receipt of a communication over the unlicensed RF band from the small cell access point, where the communication requests the location information of the mobile device. In configurations, the location determination application may periodically update the small cell access point with location information from the mobile device.

In configurations, the GPS information received from the mobile device may be utilized by the small cell access point to synchronize one or more clocks included with the small cell access point. Thus, periodic updating of the location information may be especially useful in such configurations.

FIG. 1 schematically illustrates an example wireless communication network 100 (also referred to herein as network 100). The network 100 comprises one or more macro cells (not illustrated), where each macro cell includes a macro base station 102 (referred to herein as base station 102) that may be communicatively coupled to a plurality of mobile devices, e.g., mobile device 104. Each small cell 106 includes a small cell access point 108 that communicates with a small cell gateway 110. The small cell gateway 110 couples the small cell access point 108 with an Evolved Packet Core (EPC) 112 of the wireless communication network 100. In the example of FIG. 1, the mobile device 104 and the small cell access point 108 are located in a structure, e.g., a home, an office, a mall, a store, etc.

In a configuration, the mobile device 104 may comprise any appropriate device, e.g., a stationary device or a portable electronic device, for communicating over a wireless communication network. Such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, mobile device 104 may range widely in terms of capabilities and features. For example, in a configuration, the mobile device 104 may have a numeric keypad, a capability to display only a few lines of text and be configured to interoperate with only Global System for Mobile Communications (GSM) networks. However, in another configuration, the mobile device 104 (e.g., a smart phone) may have a touch-sensitive screen, a stylus, an embedded Global Positioning System (GPS) receiver, and a relatively high-resolution display, and be configured to interoperate with multiple types of networks. The mobile device 104 may also comprise a SIM-less device (i.e., a mobile device that does not contain a functional subscriber identity module ("SIM")), a roaming mobile device (i.e., a mobile device operating outside of their home access network), and/or mobile software applications.

In a configuration, the base station 102 or small cell access point 108 may communicate voice traffic and/or data traffic with one or more mobile devices 104 using RF signals. The base station 102 may communicate with the mobile device 104 using one or more appropriate wireless communication protocols or standards. For example, the base station 102 or small cell access point 108 may communicate with the mobile device 104 using one or more standards, including but not limited to GSM, Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA) (including High Speed Downlink Packet Access (HSDPA) and High Speed Uplink Packet Access (HSUPA)), Ultra Mobile Broadband (UMB), and/or the like.

In a configuration, the mobile device 104 may comprise processor(s) 120, one or more transmit antennas (transmitters) 122, one or more receive antennas (receivers) 124, and computer-readable media 126 in the form of memory and/or cache. The processor(s) 120 may be configured to execute instructions, which may be stored in the computer-readable media 126 or in other computer-readable media accessible to the processor(s) 120. In some configurations, the processor(s) 120 is a Central Processing Unit (CPU), a Graphics Processing Unit (GPU), or both CPU and GPU, or any other sort of processing unit. The one or more transmit antennas 122 may transmit signals to the base station 102 or small cell access point 108, and the one or more receive antennas 124 may receive signals from the base station 102 or small cell access point 108. In a configuration, the antennas 122 and 124 may be included in a transceiver component of the mobile device 104.

The computer-readable media 126 may also include Computer Readable Storage Media (CRSM). The CRSM may be any available physical media accessible by a computing device to implement the instructions stored thereon. The CRSM may include, but is not limited to, Random Access Memory ("RAM"), Read-Only Memory ("ROM"), Electrically Erasable Programmable Read-Only Memory ("EEPROM"), flash memory or other memory technology, Compact Disc Read-Only Memory ("CD-ROM"), Digital Versatile Discs ("DVD") or other optical disk storage, magnetic cassettes, magnetic tape, magnetic disk storage or other magnetic storage devices, or any other medium which can be used to store the desired information and which can be accessed by the mobile device 104.

The computer-readable media 126 may store several components, such as instructions, data stores, and so forth that are configured to execute on the processor(s) 120. For instance, the computer-readable media 126 may store a configuration component 128 that may configure the mobile device for communication with various components within the wireless communication network 100 based upon various network settings. In configurations, the computer-readable media 126 may also store one or more applications 130 configured to receive and/or provide voice, data and messages (e.g., Short Message Service (SMS) messages, Multi-Media Message Service (MMS) messages, Instant Messaging (IM) messages, Enhanced Message Service (EMS) messages, etc.) to and/or from another device or component (e.g., the base station 102, the small cell access point 108, other mobile devices, etc.). The applications 130 may include a location determination application 132, as will be described further herein. The applications 130 may also include third-party applications (not illustrated) that provide additional functionality to the mobile device 104.

In configurations, the mobile device 104 also includes one or more radios 134 that are configured to transmit and receive via unlicensed Radio Frequency (RF) bands, e.g., WiFi, Bluetooth, etc. In configurations, the mobile device 104 also includes one or more radios 136 that are configured to transmit and receive RF signals via licensed RF bands, e.g., transmit and receive RF signals according to 3rd Generation Partnership Project (3GPP) protocols, Universal Mobile Telecommunications System (UMTS) protocols, Long Term Evolution (LTE) protocols, Fifth Generation (5G) protocols, etc., for communication with components of the wireless communication network 100. In a configuration, the mobile device 104 also includes a GPS receiver 138.

Although not illustrated in FIG. 1, the mobile device 104 may also comprise various other components, e.g., a battery, a charging unit, one or more network interfaces, an audio interface, a display, a keypad or keyboard, and other input and/or output interfaces.

In configurations, the small cell access point 108 includes one or more radios 140 that are configured to transmit and receive via unlicensed RF bands, e.g., WiFi, Bluetooth, etc. In configurations, the small cell access point 108 also includes one or more radios 142 that are configured to transmit and receive via licensed RF bands, e.g., transmit and receive RF signals according to 3GPP protocols, UMTS protocols, LTE protocols, 5G protocols, etc., for communication with components of the wireless communication network 100. Also, in configurations, the small cell access point 108 also includes one or more clocks 144. The small cell access point 108 may or may not, depending on the configuration, include a GPS receiver (not illustrated). Although not illustrated in FIG. 1, the small cell access point 108 may also comprise various other components.

In configurations, when the small cell access point 108 is initially activated, the small cell access point 108 may activate the unlicensed RF band radio 140, e.g., WiFi, and communicate with the nearby mobile device 104. The small cell access point 108 may request the location of the mobile device 104. The mobile device 104 may determine its location using the GPS receiver 138, if the mobile device 104 includes a GPS receiver 138. If the mobile device 104 does not include the GPS receiver 138 or if the GPS receiver 138 cannot receive GPS signals of sufficient accuracy, the mobile device 104 may obtain its location from the base station 102 with which the mobile device 104 has currently registered for service within the wireless communication network 100. The mobile device 104 may then provide the location information using the unlicensed RF band radio 134 included with the mobile device 104. For example, the mobile device 104 may provide the location information to the small cell access point 108 using WiFi.

The small cell access point 108 may then report its own location as equal to the location information received from the mobile device 104 to the small cell access point gateway 110 of the wireless communication network 100 for registration purposes. The small cell access point gateway 110 may, based upon the location information, received from the small cell access point 108, register the small cell access point 108 for service within the wireless communication network 100. In a configuration, the small cell access point 108 communicates with the small cell access point gateway over a network, e.g., the Internet. Upon successful registration of the small cell access point 108, the small cell access point 108 may communicate with, for example, an EPC network 112 of the wireless communication network 100 over the network, e.g., the Internet, to provide services to the mobile device 104 (as well as other mobile devices).

Once the small cell access point 108 is registered for service within the wireless communication network 100, the small cell access point 108 may operate the licensed RF band radio 142, e.g., transmit and receive RF signals according to 3GPP protocols, UMTS protocols, LTE protocols, 5G protocols, etc. Once the mobile device 104 receives RF signals in the licensed band from the small cell access point 108, the mobile device 104 may perform a handover from the base station 102 to the small cell access point 108 and receive services, e.g., voice call services, data services, etc., from the wireless communication network 100 via the small cell access point 108.

In configurations, the mobile device 104 may include the location determination application 132 that may be utilized by the mobile device 104 to determine the location of the mobile device 104 using, for example, the GPS receiver 138, if included with the mobile device 104. In configurations, the location determination application 132 may be utilized to determine the location of the mobile device 104 by obtaining GPS information from the base station 102. For example, the location determination application 132 may be utilized to determine the location of the mobile device 104 by obtaining GPS information from the base station 102 if the GPS receiver 138 is unbale to obtain the GPS information or if the mobile device 104 does not include the GPS receiver 138.

In configurations, the location determination application 132 may automatically provide the location information to the small cell access point 108 over the unlicensed RF band upon detection, by the mobile device 104, of the small cell access point 108. In configurations, the location determination application 132 may determine the location of the mobile device 104 and provide the location information to the small cell access point 108 upon receipt of a communication over the unlicensed RF band from the small cell access point 108, where the communication requests the location information of the mobile device 104. In configurations, the location determination application 132 may periodically update the small cell access point 108 with location information from the mobile device 104.

In configurations, the GPS information received from the mobile device 104 may be utilized by the small cell access point 108 to synchronize one or more clocks 144 included with the small cell access point 108. Thus, periodic updating of the location information may be especially useful in such configurations.

In configurations, after power cycling of the small cell access point 108, the small cell access point 108 may communicate with the mobile device 104 using the unlicensed RF band radio 140 to obtain location information from the mobile device 104 via the unlicensed RF band radio 134 to allow the small cell access point 108 to "re-register" with the small cell access point gateway 110, as previously described. As is known, power cycling the small cell access point 108 refers to "resetting" the small cell access point 108. Power cycling involves turning off the small cell access point 108 and then turning the small cell access point 108 back on again, e.g., turning the power off and then back on again. Usually, the small cell access point 108 sits without power for a couple seconds after turning the small cell access point 108 off to make sure the memory in the small cell access point 108 is fully cleared before turning the small cell access point 108 back on.

Any electronic device can be power cycled, but the term is frequently used with cable modems, DSL modems, and routers. This is because small internal errors in these devices can prevent them from functioning correctly. Resetting them typically fixes the errors and allows them to work correctly again Thus, the small cell access point 108 is able to determine its location upon activation and/or after power cycling from the mobile device 104 using communications transmitted and received with the unlicensed RF band radio 140, e.g., WiFi, Bluetooth, etc. This is especially useful when the small cell access point 108 is unable to receive GPS signals or communicate directly with a macro base station, e.g., base station 102. The inability to receive a valid GPS signal may be the result of, for example, the small cell access point 108 being located inside a building where GPS signals do not penetrate. The inability to communicate directly with the base station 102 may be the result of, for example, distance from the base station 102, the structure 114 within which the small cell access point 108 is located, etc. Since the mobile device 104 may have better capabilities as far as receiving a GPS signal or communicating with the base station 102 from a distance and/or through the structure 114, e.g., being located closer to windows, etc., the mobile device 104 is able to determine its location, which also corresponds to the location for the small cell access point 108.

Figure 2:
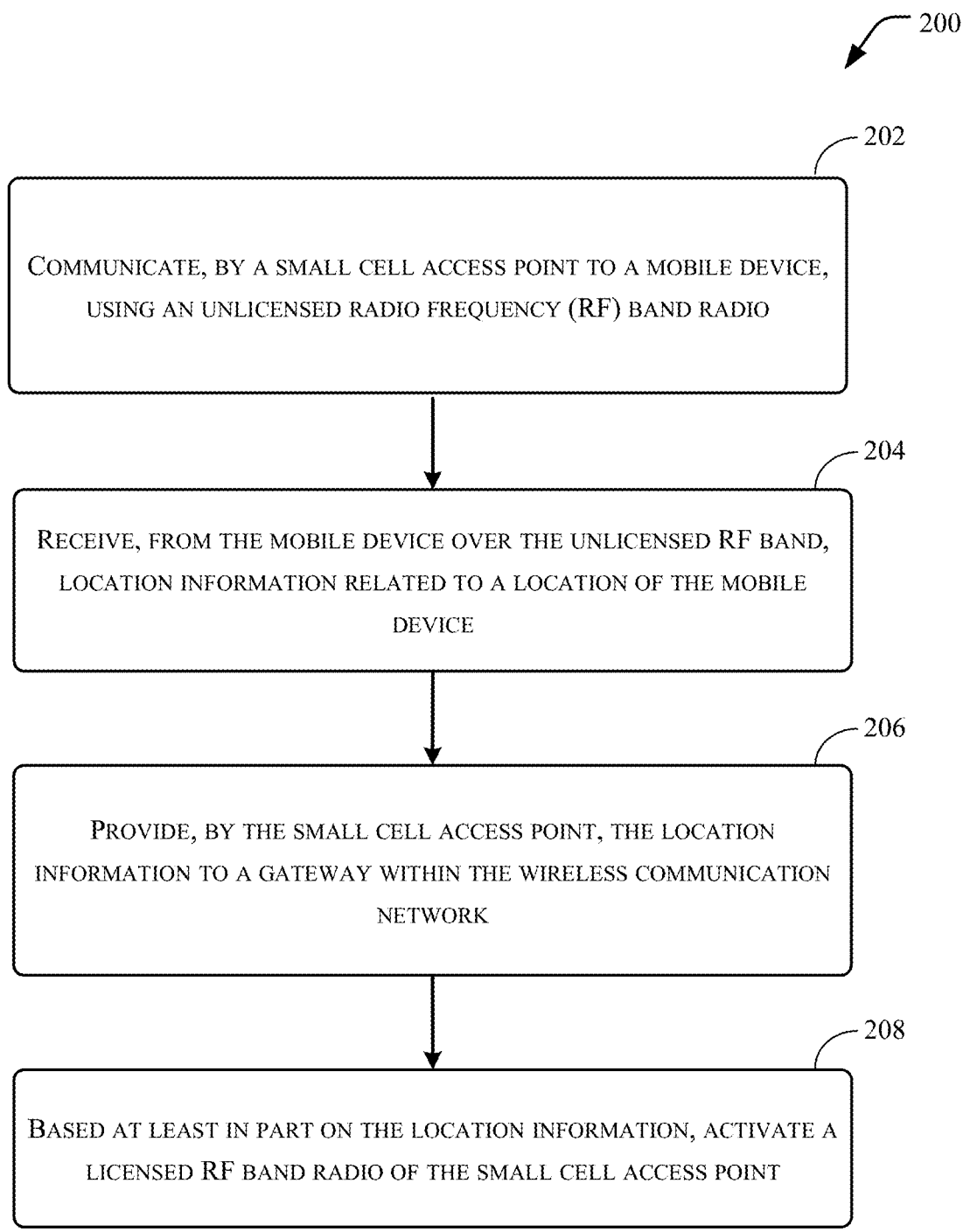
FIG. 2 is a flowchart illustrating a method of determining a location of a small cell access point in the wireless communication network of FIG. 1, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram illustrating an example method 200 of determining, by a small cell access point, e.g., small cell access point 108, a location of the small cell access point in a wireless communication network, e.g., wireless communication network 100. As illustrated, at block 202, the small cell access point within the wireless communication network initiates communication to a mobile device, e.g., mobile device 104, using an unlicensed radio frequency (RF) band radio, e.g., unlicensed RF band radio 140 operating according to, for example, WiFi protocol, Bluetooth protocol, etc., of the small cell access point. At block 204, the small cell access point receives, from the mobile device over the unlicensed RF band, location information related to a location of the mobile device. For example, the mobile device may use its unlicensed RF band radio 134 to transmit GPS information pertaining to the location of the mobile device to the small cell access point. The mobile device may obtain the GPS information using a GPS receiver, e.g., GPS receiver 138 or from a base station, e.g., base station 102, with which the mobile device is registered. Due to the close proximity of the mobile device to the small cell access point, the small cell access point may use the location of the mobile device as the location of the small cell access point.

At block 206, the small cell access point provides the location information to a gateway, e.g., small cell access point gateway 110, within the wireless communication network. At block 208, based at least in part on the location information, a licensed RF band radio of the small cell access point is activated. For example, based at least in part on the location information, the small cell access point gateway may register the small cell access point for service within the wireless communication network. The small cell access point may then activate a licensed RF band radio, e.g., the licensed RF band radio 142, and the small cell access point may then transmit and receive RF signals over the licensed RF band, e.g., transmit and receive RF signals according to 3GPP protocols, UMTS protocols, LTE protocols, 5G protocols, etc.

Thus, a small cell access point is able to determine its location upon activation and/or after power cycling using communications transmitted and received with an unlicensed RF band radio, e.g., WiFi, Bluetooth, etc. This is especially useful when the small cell access point is unable to receive a valid GPS signal or directly communicate with a macro base station for the purpose of receiving location information. The inability to receive a valid GPS signal may be the result of, for example, the small cell access point being located inside a building where GPS signals do not penetrate. The inability to communicate directly with a macro base station may be the result of, for example, distance from the base station, the building within which the small cell access point is located, etc. Since the mobile device may have better capabilities as far as receiving a GPS signal or communicating with a base station from a distance and/or through the building, e.g., being located closer to windows, etc., the mobile device is able to determine its location, which also corresponds to the location for the small cell access point.

Figure 3:
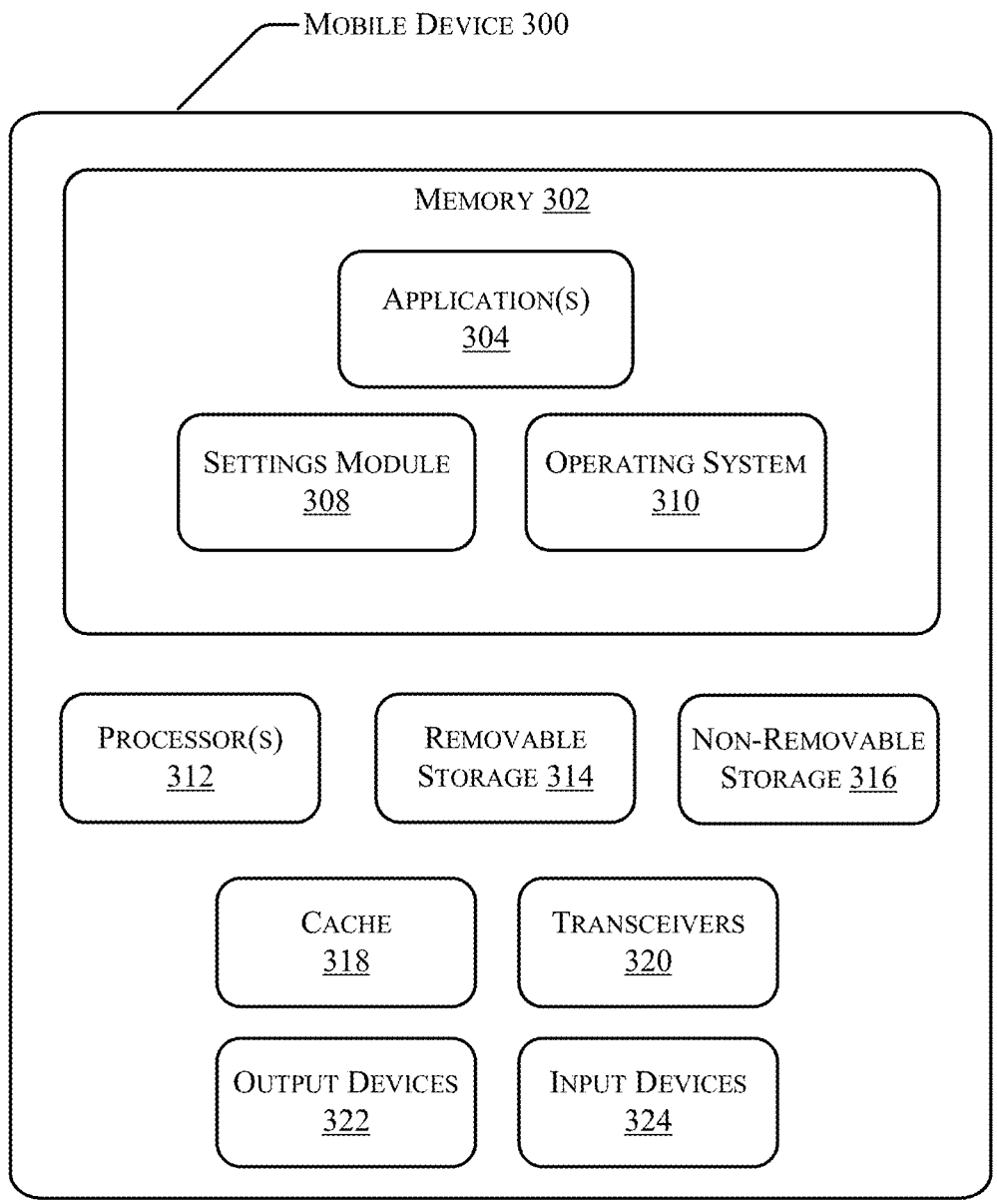
FIG. 3 schematically illustrates a component level view of an example mobile device configured for use in the wireless communication network of FIG. 1, in accordance with various configurations.

FIG. 3 schematically illustrates a component level view of a mobile device 300, such as mobile device 104, configured to function within wireless communication network 100. As illustrated, the mobile device 300 comprises a system memory 302, e.g. computer-readable media 146, storing application(s) 304, e.g., applications 130 and location determination application 132, a settings module 308, and an operating system 310. Also, the mobile device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316. Additionally, the mobile device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 300. Any such non-transitory computer-readable media may be part of the mobile device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the mobile device 300 to define how the user wishes certain calls from third parties to be handled by the wireless communication network, as previously described herein.

Figure 4:
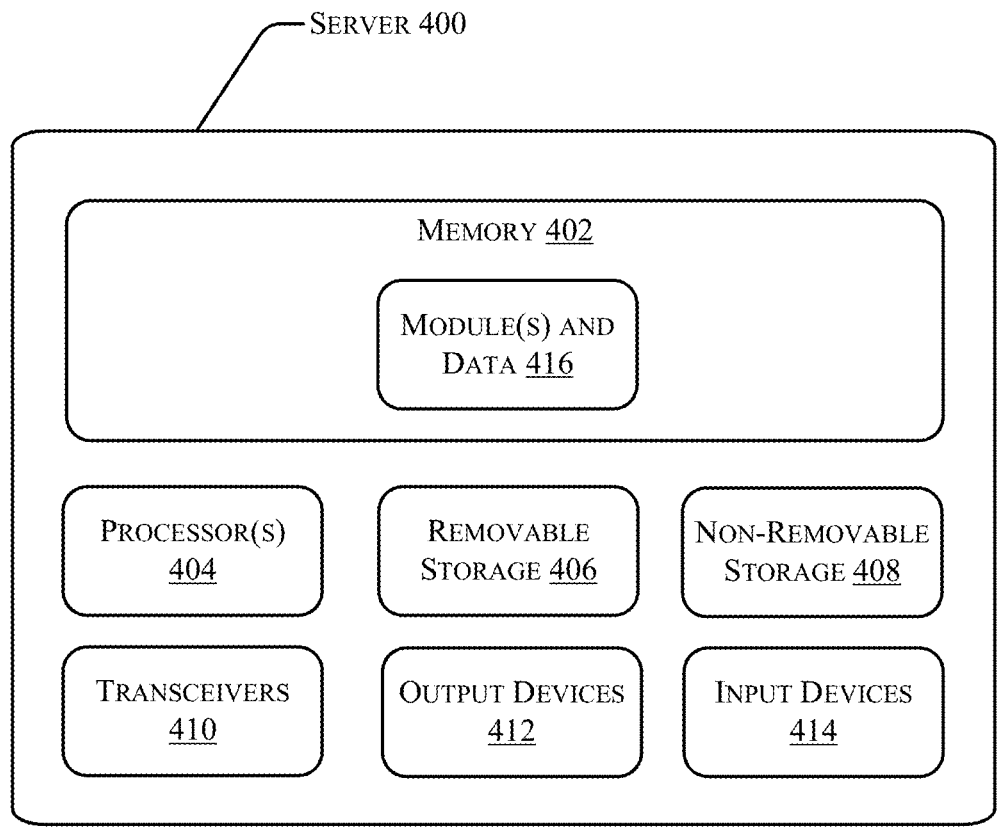
FIG. 4 schematically illustrates a component level view of a server configured for use in the wireless communication network of FIG. 1 to provide various services of the wireless communication network of FIG. 1, in accordance with various configurations.

FIG. 4 illustrates a component level view of a server 400 configured for use within a wireless communication network, e.g., wireless communication network 100 in order to provide various services within the wireless communication network, according to the techniques described herein. For example, the server 400 may serve as the small cell access point gateway 110, e.g., one or more servers 400 may be configured to serve as the small cell access point gateway 110. As illustrated, the server 400 comprises a system memory 402 that may store data and one or more components and/or applications 416 for interacting with mobile devices 400, e.g., mobile devices 104, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a j oystick-like controller and/or designated navigation buttons, or the like.

While the description above uses GPS as a location system, those familiar with the state of the art appreciate that other alternatives exist for determining location, for example GLONASS (Global Navigation Satellite System), the Galileo navigation system, or the BeiDou Navigation Satellite System.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method within a wireless communication network, the method comprising:
   communicating, by a small cell access point within the wireless communication network and in response to power cycling of the small cell access point, with a mobile device using an unlicensed radio frequency (RF) band radio of the small cell access point;
   sending, by the small cell access point to the mobile device over the unlicensed RF band, a request for location information related to a location of the mobile device;
   receiving, by the small cell access point from the mobile device over the unlicensed RF band and in response to sending the request, the location information related to the location of the mobile device;
   providing, by the small cell access point to a gateway within the wireless communication network, the location information; and
   based at least in part on the location information, activating a licensed RF band radio of the small cell access point.

2. The method of claim 1, wherein the unlicensed RF band comprises one of WiFi or Bluetooth.

3. The method of claim 1, further comprising periodically receiving, by the small cell access point from the mobile device, the location information related to the location of the mobile device.

4. The method of claim 1, wherein the small cell access point comprises one of a femtocell or a picocell.

5. The method of claim 1, further comprising:
   based at least in part on the location information, synchronizing, by the small cell access point, a clock of the small cell access point.

6. The method of claim 1, wherein the location information is based upon Global Positioning System (GPS) information.

7. The method of claim 1, wherein the location information is provided to the small cell access point in response to a communication between the small cell access point and the mobile device using the unlicensed RF band radio.

8. The method of claim 1, wherein the location information related to the location of the mobile device is obtained from a base station with which the mobile device is registered.

9. A small cell access point within a wireless communication network, the small cell access point comprising:
   one or more processors;
   a non-transitory storage medium; and
   instructions stored in the non-transitory storage medium, the instructions being executable by the one or more processors to:
   communicate, in response to the small cell access point powering off and then powering on, with a mobile device using an unlicensed radio frequency (RF) band radio of the small cell access point;
   receive, from a location determination application of the mobile device over the unlicensed RF band, location information related to a location of the mobile device;
   provide, to a gateway within the wireless communication network, the location information; and
   based at least in part on the location information, activating a licensed RF band radio of the small cell access point.

10. The small cell access point of claim 9, wherein the unlicensed RF band comprises one of WiFi or Bluetooth.

11. The small cell access point of claim 9, wherein the instructions are further executable by the one or more processors to:
    request, from the mobile device, the location information related to the location of the mobile device.

12. The small cell access point of claim 9, wherein the instructions are further executable by the one or more processors to periodically receive the location information related to the location of the mobile device.

13. The small cell access point of claim 9, further comprising a first radio configured to operate in the unlicensed RF band and a second radio configured to operate in the licensed RF band, the instructions are further executable by the one or more processors to communicate with the mobile device using the first radio of the small cell access point subsequent to activation or power cycling of the small cell access point.

14. The small cell access point of claim 9, wherein the small cell access point comprises one of a femtocell or a picocell.

15. The small cell access point of claim 9, wherein the instructions are further executable by the one or more processors to:
    based at least in part on the location information, synchronize a clock of the small cell access point.

16. The small cell access point of claim 9, wherein the location information is based upon Global Positioning System (GPS) information.

17. The small cell access point of claim 9, wherein the small cell access point is located within a structure.

18. The small cell access point of claim 9, wherein the location information is provided to the small cell access point in response to a communication between the small cell access point and the mobile device using the unlicensed RF band radio.

19. A system comprising a small cell access point within a wireless communication network, the small cell access point comprising:
    one or more processors;
    a non-transitory storage medium; and
    instructions stored in the non-transitory storage medium, the instructions being executable by the one or more processors to:
    communicate, by a small cell access point within the wireless communication network and in response to power cycling of the small cell access point, with a mobile device using an unlicensed radio frequency (RF) band radio of the small cell access point;
    send, by the small cell access point to the mobile device over the unlicensed RF band, a request for location information related to a location of the mobile device;
    receive, by the small cell access point from the mobile device over the unlicensed RF band and in response to sending the request, the location information related to a location of the mobile device;
    provide, by the small cell access point to a gateway within the wireless communication network, the location information; and based at least in part on the location information, activating a licensed RF band radio of the small cell access point.

20. The system of claim 19 wherein, the small cell access point and the mobile device are located in a structure that prevents the small cell access point from directly communicating with a base station.

* * * * *